United States Patent
Niemelä

[11] Patent Number: 6,158,318
[45] Date of Patent: Dec. 12, 2000

[54] SAWING MACHINE

[76] Inventor: Ahti Niemelä, Sarkontie 12, FIN-26510, Rauma, Finland

[21] Appl. No.: 09/269,354

[22] PCT Filed: Sep. 9, 1997

[86] PCT No.: PCT/FI97/00536

§ 371 Date: Mar. 23, 1999

§ 102(e) Date: Mar. 23, 1999

[87] PCT Pub. No.: WO98/13165

PCT Pub. Date: Apr. 2, 1998

[30] Foreign Application Priority Data

Sep. 23, 1996 [FI] Finland ..................................... 963788
Dec. 13, 1996 [FI] Finland ..................................... 965023

[51] Int. Cl.[7] ................................................... B26D 1/56
[52] U.S. Cl. .............................. 83/298; 83/318; 83/326; 83/329; 83/338
[58] Field of Search ............................... 83/338, 298, 318, 83/326, 329, 471.2, 471.1, 490

[56] References Cited

U.S. PATENT DOCUMENTS 4,468,993  9/1984  McCown et al. ................... 83/471.1 X
5,063,801  11/1991  Wallis .................................... 83/327 X
5,544,557  8/1996  Wierschke ............................ 83/330 X
5,557,997  9/1996  Wunderlich et al. ................. 83/327 X
5,924,346  7/1999  Wunderlich et al. ................. 83/327 X

FOREIGN PATENT DOCUMENTS 2053723  6/1971  Germany ............................. 83/338 X

*Primary Examiner*—M. Rachuba
*Attorney, Agent, or Firm*—Andrus, Sceales, Starke & Sawall, LLP

[57] ABSTRACT

A sawing device for sawing a long object to a fixed size, said sawing device comprising a conveyor (1) for conveying the object to be sawn and blades (3, 4) rotated by a first power unit (2) for cutting the object. The sawing device comprises a rotatable frame (6) rotated by a second power unit (5), the blades (3, 4) being supported by said rotatable frame, a third power unit (7) and guide bars (8, 9) in the rotatable frame to allow the blades (3, 4) to be moved back and forth by the third power unit along the guide bars in the longitudinal direction of the object to be sawn.

7 Claims, 1 Drawing Sheet

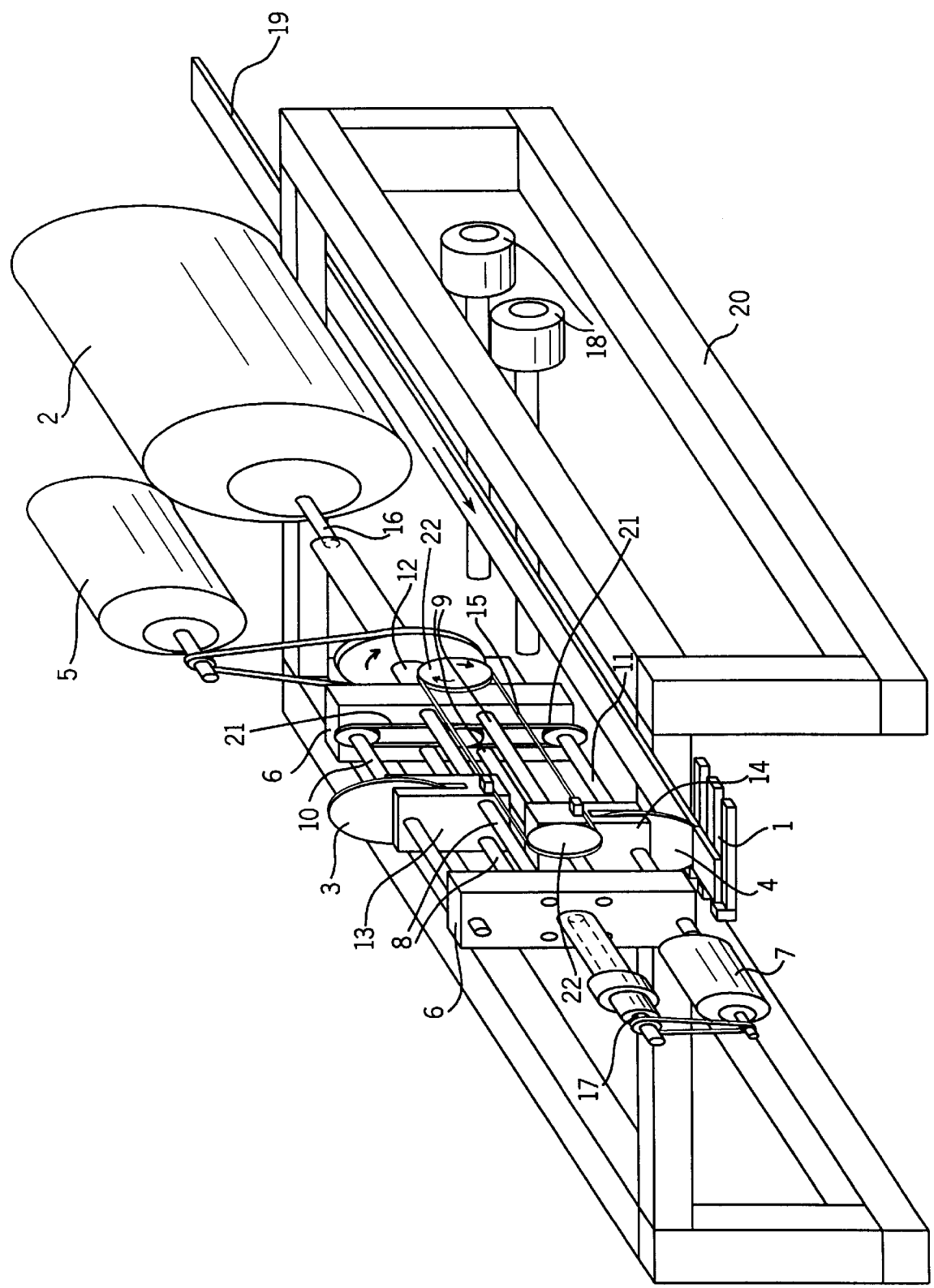

SAWING MACHINE

BACKGROUND OF THE INVENTION

The present invention relates to a sawing device as defined in the claims.

Traditonally, long timber is sawn to a fixed size by moving the timber against a stopper adjusted to a suitable position with respect to the saw blade used, so that when the timber is in position the saw blade cuts a piece of desired fixed length off the timber. The fixed-length piece is then removed and the timber to sawn is further advanced longitudinally against the stopper. In this manner, sawing is continued in stages by moving the timber and then sawing it.

The main problem with present sawing equipment and methods used to cut timber to a fixed size is that they are slow, which is due to the intermittent nature of the sawing. As the cutting operation itself is a relatively fast action, most of the time is consumed while the saw blade is waiting for the timber to be moved into the sawing position against the stopper. The slowness of sawing is a particularly bad problem in industries where there is a need for large quantities of relatively short fixed-length timber pieces, for example in furniture industry, prefabricated building industry and parquet industry.

SUMMARY OF THE INVENTION

The object of the invention is to eliminate the drawbacks referred to above. A specific object of the invention is to produce a new type of sawing device that enables long timber to be accurately cut into fixed-length pieces in a continuous process as fast as possible.

As for the features characteristic of the sawing device of the invention, reference is made to the claims.

The sawing device of the invention comprises a conveyor for conveying the timber to be sawn and blades for cutting the timber at desired points, said blades being rotated by a first power unit and disposed in a transverse position relative to the lengthways direction of the timber to be sawn. According to the invention, the sawing device comprises a rotatable frame rotated by a second power unit and supporting the blades, of which there are preferably at least two. Moreover, the sawing device comprises a third power unit and, in the rotatable frame, guide rails along which the blades can be moved back and forth by means of the third power unit in the direction on the axles of the blades. i.e. in the longitudinal direction of the timber to be sawn.

Thus, as the axes of rotation of the blades and the axis of rotation of the rotatable frame are parallel to each other and parallel to the direction of motion of the timber to be sawn, it is possible, by rotating the blades and the rotatable frame supporting them, to cut the timber to a fixed size while the timber is in continuous and steady motion, by only moving the blades back and forth in the direction of their axles at the velocity of motion of the timber.

DETAILED DESCRIPTION OF THE INVENTION

The rotatable frame preferably comprises blade axle disposed at the same distance from the axle of the rotatable frame and parallel to it.

The blades are preferably supported by separate blade holders movable along guide bars parallel to the axles of the blades.

The back-and-forth movement of the blades in the direction of their axles is preferably implemented using a motion chain, which is connected to the blade holders and can be moved back and forth.

In a preferred embodiment, none of the power units is mounted on the rotatable frame, but the first, second and third power units are mounted outside the rotatable frame and coupled via concentric axles to the rotatable frame.

The third power unit, which moves the blades back and forth in the direction of the axles, is preferably arranged to work in synchronism with the conveyor that moves the timber to be sawn, in such manner that the velocity of motion of the sawing blade in the direction of its axle is always the same as the velocity of the timber moving on the conveyor.

The sawing device of the invention preferably has two sawing blades mounted in the rotatable frame, but the number of blades can also be considerably larger, in wich a lower speed of rotation of the rotatable frame will result in the same sawing efficiency.

The sawing device of the invention has significant advantages as compared with prior art. The production of a large number of fixed-size pieces of wood is not an intermittent but a continuous and smooth process in which the timber to be processed is moving at a constant speed throughout the sawing process. Thus, for example, from a normal board the sawing device can cut three fixed-size pieces of 60 cm per second, and even more.

In the following, the invention will be described in detail by referring to the attached drawing, which presents an axonometric diagram of a sawing device according to the invention.

The sawing device of the invention presented in the drawing comprises a suitable conveyor 1 together with its power units 18 for moving an object to be sawn 19 in its lengthways direction. The sawing device comprises a rotatable frame 6, which is supported by its axle 12, which in turn is supported on the frame 20 of the sawing device. Supported on the frame 20, a second power unit 5 is arranged to rotate the rotatable frame 6 about its axle 12.

Mounted between the two end pieces of the rotatable frame 6 and parallel to the axle 12 are a first pair of guide bars 8 and a second pair of guide bars 9 as well as a first blade axle 10 and a second blade axle 11. Supported on the first guide bars 8 and the first blade axle 10 is a first blade holder 13, which carries a first blade 3. In the same way, a second blade holder 14 carrying a second blade 4 is supported on the second blade axle 11 and the second guide bars 9. The blade axles 10 and 11 are coupled via power transmission belts 21 to an axle 16 concentric with the axle 12 of the rotatable frame 6 and mounted inside it and coupled to a first power unit 2, which is mounted on the frame 20, to rotate the blade 3 and 4.

The blade holders 13 and 14 supported on the guide bars 8 and 9 are attached to a motion chain 15, which moves back and forth responsive to alternating clockwise and couneterclockwise movement of chain wheels 22. The chain wheels are rotated clockwise and counterclockwise by means of a third power unit 7, which is coupled to the chain wheels via an axle 17 concentric with the axle of the rotatable frame and mounted inside it.

The sawing device presented in the drawings works as follows. The first power unit 2 rotates the saw blades 3 and 4 while the second power unit 5 rotates the rotatable frame 6 at a suitable speed. The third power unit 7 moves the blade holders 13 and 14 and the sawing blades 3 and 4 rotating with these back and forth in the direction of motion of the object to be sawn or laterally along the guide bars 8 and 9 so that when one of the blade holders is moving forward, the other one is moving backward. Thus, when the device is in operation, as the conveyor 1 is moving the object at the same speed as the third power unit 7 is moving the blades in the longitudinal direction of the object, when the sawing blade engages the object, it will be moving at the speed of the object, cut it through and leave the object area before stopping and returning to the first end of the rotatable frame.

Thus, in the sawing device the sawing blade touches the moving object to be sawn while itself moving at the speed of the object in the same direction and, after cutting the object, moves aside and returns back to the starting position of a new sawing operation. At the same time, the other saw blade performs corresponding sawing and returning actions on the opposite side of the common rotation axis of the saw blades.

The synchronization of the motors in the sawing device and of their movements can be implemented using electronic or mechanical means known in themselves. The blades 3 and 4 are preferably rotated continuously by means of the first power unit 2, but the rotation of the rotatable frame 5 by the second power unit 5 and the back-and-forth motion of the blade holder produced by the third power unit 7 may be either continuous or intermittent according to need, depending e.g. on the quality of the object to be sawn, on the blades being used, the length of the pieces to be cut, and so on.

The invention has been described above as an example by the aid of the attached drawing, but different embodiments of the invention are possible within the framework of the inventive idea defined by the claims.

What is claimed is:

1. A sawing device for sawing a long object to a fixed size, said sawing device comprising:

a conveyor (1) for conveying the object to be sawn at a certain speed in a direction of motion from a starting position of a sawing operation, blades (3,4) rotated by a first power unit (2) for cutting the object;

a rotatable frame (6) rotated by a second power unit (5), the blades (3,4) being supported by said rotatable frame, a third power unit (7); and the rotatable frame (6) having guide bars (8,9), the blades (3,4) being supported by blade holders (13,14) movable along the guide bars (8,9), so that when sawing the object the third power unit moves one of the blade holders and blades in the direction of motion at the speed of the object when at the same time the other blade holder and the blade is moved opposite the direction of motion to the starting position for a new sawing operation.

2. A sawing device as defined in claim 1, wherein the rotatable frame (6) comprises blade axles (10,11) disposed at a like distance from and parallel to an axle (12) of the rotatable frame.

3. A sawing device as defined in claim 1, wherein the blade holders (13,14) are connected to a motion chain (15) which is moved back and forth.

4. A sawing device as defined in claim 1, wherein the first, second and third power units (2,5,7) are coupled via concentric respective axles (16,12,17) to the rotatable frame (6).

5. A sawing device as defined in claim 1, wherein the third power unit (7) is arranged to move the blades (3,4) at the speed of motion of the object to be sawn and in the direction of motion of the object (1).

6. A sawing device as defined in claim 1, wherein the blades (3,4) are discoid circular-saw blades.

7. A sawing device as defined in claim 1, wherein the object to be sawn is timber.

* * * * *